(12) United States Patent
Van Der Westhuizen

(10) Patent No.: US 7,681,942 B2
(45) Date of Patent: Mar. 23, 2010

(54) ACCESSORY FOR A MOTORCYCLE

(76) Inventor: Pieter Daniel Van Der Westhuizen, 140 Koos de la Rey Street, Pretoria North, 0182 Pretoria (ZA)

( * ) Notice: Subject to any disclaimer, the term of this patent is extended or adjusted under 35 U.S.C. 154(b) by 0 days.

(21) Appl. No.: 11/911,820

(22) PCT Filed: Apr. 18, 2006

(86) PCT No.: PCT/IB2006/051196

§ 371 (c)(1),
(2), (4) Date: Jan. 9, 2008

(87) PCT Pub. No.: WO2006/111923

PCT Pub. Date: Oct. 26, 2006

(65) Prior Publication Data

US 2008/0150314 A1 Jun. 26, 2008

(30) Foreign Application Priority Data

Apr. 18, 2005 (ZA) ................................. 2005/3116

(51) Int. Cl.
*B62D 35/02* (2006.01)
*B62J 23/00* (2006.01)

(52) U.S. Cl. ................................ 296/180.5; 244/103 R; 280/160.1

(58) Field of Classification Search ... 296/180.1–180.5, 296/78.1; 280/152.05, 152.1, 152.2, 152.3, 280/852, 158.1, 160.1; 244/103 R; 293/105
See application file for complete search history.

(56) References Cited

U.S. PATENT DOCUMENTS

| 1,026,293 | A | * | 5/1912 | Adix | .......................... 280/160 |
| 3,979,147 | A | | 9/1976 | Kelley | |
| 6,494,473 | B1 | * | 12/2002 | Baghboian | .................. 280/160 |

FOREIGN PATENT DOCUMENTS

| DE | 3420350 | * | 12/1985 |
| DE | 34 31 404 A1 | | 3/1986 |
| DE | 42 32 239 A1 | | 3/1994 |
| FR | 2 858 793 A1 | | 2/2005 |

* cited by examiner

*Primary Examiner*—Dennis H Pedder
(74) *Attorney, Agent, or Firm*—Sughrue Mion, PLLC

(57) ABSTRACT

The invention provides a fairing assembly (10) for a motorcycle (12) including an aerodynamic shield (11) and a mounting arrangement for mounting the shield (11) on a motorcycle (12). The shield (11) is operable between a stowed condition and an operative condition. In the operative condition, the shield (11) is positioned to reduce aerodynamic drag on a front wheel (13) of a motorcycle (12), such that, in use, the drag on the front wheel (13) is smaller when the shield (11) is in its operative condition than when the shield (11) is in its stowed position. The invention also extends to a motorcycle (12) having such an aerodynamic shield (11) mounted adjacent a front wheel (13) of the motorcycle (12). The invention further extends to a method of improving the aerodynamic characteristics of a motorcycle (12).

23 Claims, 5 Drawing Sheets

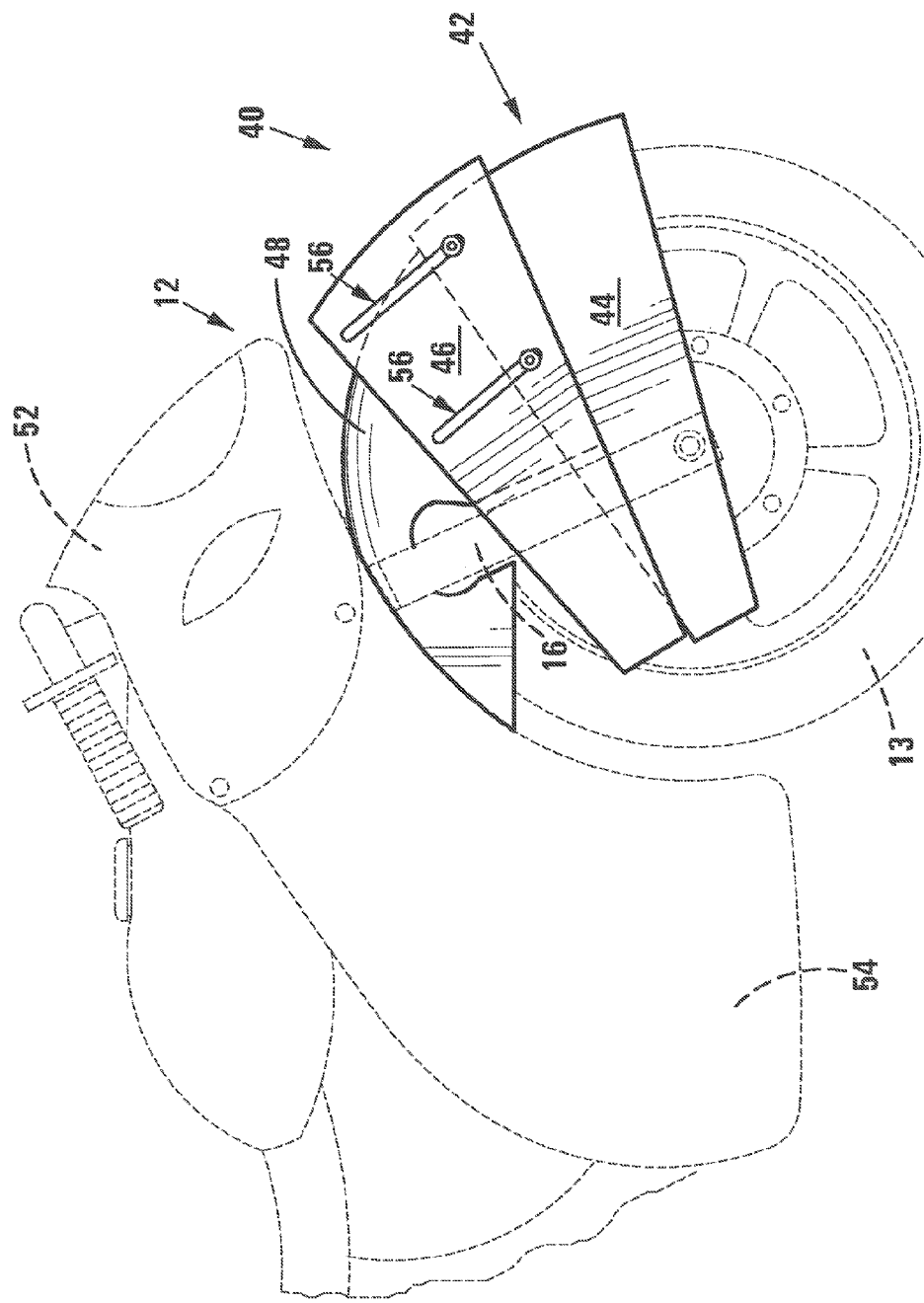

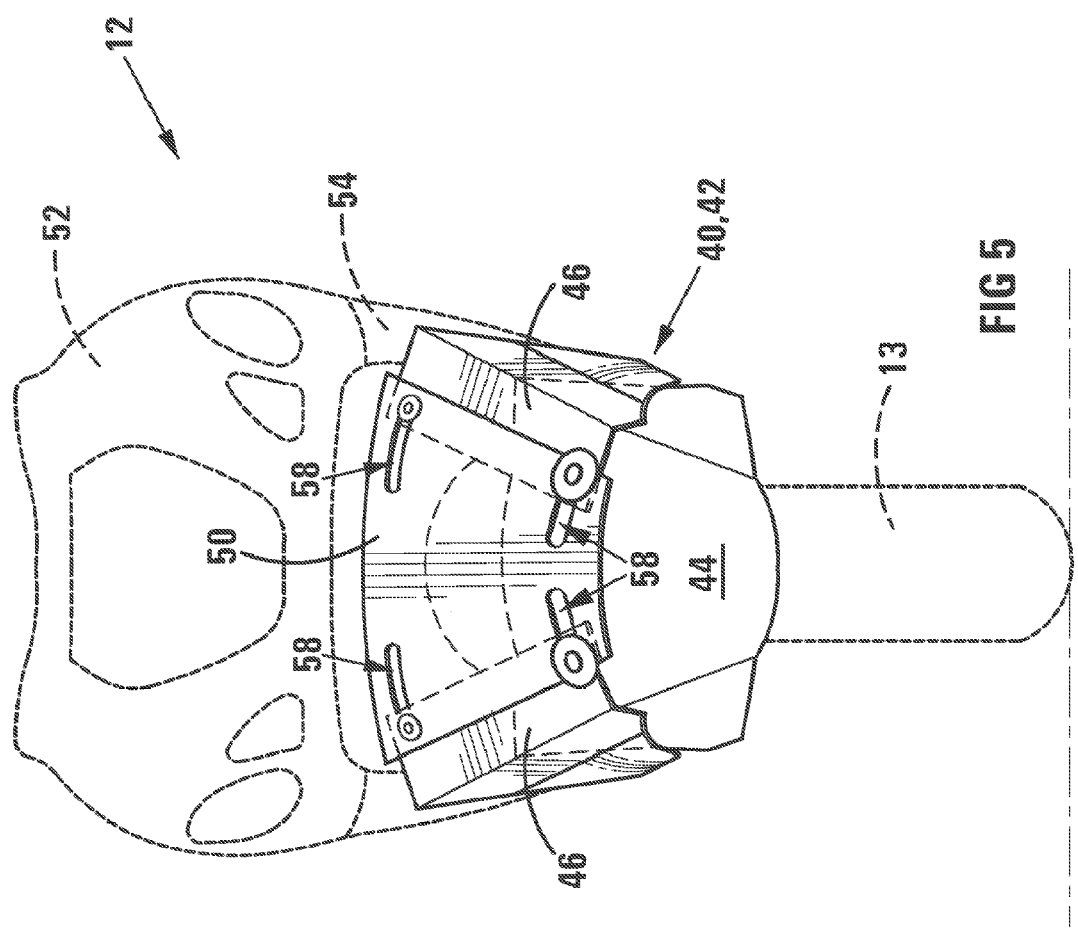

ACCESSORY FOR A MOTORCYCLE

CROSS REFERENCE TO RELATED APPLICATIONS

This application is a National Stage of International Application No. PCT/IB2006/051196 filed on Apr. 18, 2006, claiming priority based on South African Patent Application No. 2005/03116, filed Apr. 18, 2005, the contents of all of which are incorporated herein by reference in their entirety.

THIS INVENTION relates to an accessory for a motorcycle. More particularly, it relates to a fairing assembly for a motorcycle. The method extends to a motorcycle, and to a method of improving aerodynamic characteristics of a motorcycle.

The invention provides a fairing assembly for a motorcycle, which assembly includes:

an aerodynamic shield which is operable between a stowed condition and an operative condition in which the shield is positioned to reduce aerodynamic drag on a front wheel of a motorcycle, such that, in use, the drag on the front wheel is smaller when the shield is in its operative condition than when it is in its stowed position; and a mounting arrangement for mounting the shield on a motorcycle.

Preferably, a frontal projected area of the shield is greater in its operative condition than in its stowed condition. By frontal projected area of the shield is meant that area of the shield which is visible on a two-dimensional representation of the motorcycle seen from the front, relative to the fore and aft direction of the motorcycle.

The shield may, in its operative condition, shield at least an upper quarter, preferably an upper half of the front wheel, when the shield is seen in frontal projection.

The shield may, in its operative condition, additionally cover a substantial part of sides of the front wheel. By a substantial part of the sides of the front wheel is meant that at least ⅛ of the area of the wheel is covered by the shield, when the wheel is viewed from a side of the motorcycle, along the rotational axis of the wheel. Preferably, the shield covers at least half of the area of the wheel, when the shield is in its operative condition.

In a particular embodiment of the invention, the shield comprises at least two components which are relatively displaceable to switch the shield from its stowed condition to its operative condition. Typically, each of the shield components may be of plate material and may be generally U-shaped, having a pair of limbs which extend along opposite sides of the front wheel, in use, and a curved front portion connecting the limbs. The components may be of metal alloy material, moulded synthetic plastic material, or a carbon fibre composite material.

The shield components may be telescopically displaceable, so that the components are nested one within the other when the shield is in its stowed condition. In such case, the shield components may be mounted for relative displacement about a pivot axis which is transverse to the limbs of the components, the pivot axis preferably being located on a trailing side of a rotational axis of the wheel, at the free ends of the limbs of the components.

In another embodiment of the invention, the shield may include a foldable cover which is extendible concertina-fashion between an extended condition and a retracted condition corresponding respectively to the operative condition and stowed condition of the shield.

The nesting components may have complementary shoulders or stop formations interacting to limit the displacement of the components relative to one another, between an extended position and a retracted position. In the extended position of the components, they provide maximum protection against aerodynamic drag for the frontal motorcycle area and wheel.

The mounting means may include bolts bolting the limbs of one of the fairing components to a fork member of a front wheel fork of the motorcycle. The bolts may be coaxially aligned, and may be parallel to the front wheel rotational axis.

The mounting arrangement may be configured for fixedly mounting one of the shield components on a front steering fork of the motorcycle, at least one other shield component being displaceable relative to the fixed component. In a particular embodiment, the assembly includes three telescopic shield components, the shield comprising a middle component which is fixed relative to the steering fork, and upper- and lower components which are pivotally displaceable in opposite directions towards and away from the middle component. The fixed component may thus be mounted on the steering fork of the motorcycle, to pivot about the steering axis of the front wheel, in use, or, instead, in the fixed component may be mounted on a chassis or body of the motorcycle, so that the position of the fixed component remains unchanged when the front wheel is pivoted to steer the motorcycle.

The shield, in its operative condition, may cover a mudguard positioned above the front wheel, the mudguard being exposed when the shield is in its stowed condition. Advantageously, the fixed component may be integrally formed with a mud guard of the front wheel.

Advantageously, the shield may be shaped to correspond to the profile of side and/or top fairings of the motorcycle, when the motorcycle is seen in the front view, to promote smooth air flow from the shield on to the fairings. The shield may thus be tapered, so that it is wider at its top than at its bottom. In such case, the composite shield may increase in width at its upper edge when the shield is moved from its stowed condition into its operative condition. Preferably, a trailing edge of the shield may be more or less flush with corresponding leading edges of side and/or top fairings of the motorcycle, to promote an aerodynamically smooth transition from the shield to the side and/or top fairings.

In instances where the shield widens upwardly, the shield may comprise a fixed component and a laterally expandable displaceable subassembly mounted on the fixed component for movement relative to the fixed component into the operative condition. The laterally expandable displaceable subassembly may comprise two cheek plates on opposite sides of the motorcycle wheel, and a nose plate which extends transversely between the side plates at a front of the assembly, the nose plate being more or less horizontally slidable relative to the cheek plates.

The shield, in its operative condition, may be arranged automatically and dynamically to adjust in effective size, to accommodate suspension movements of the front wheel relative to a body of the motorcycle. It will be appreciated that, due to a suspension arrangement on the steering fork of the front wheel, the front wheel continually moves closer to and further away from handlebars of the motorcycle, in use. Preferably, the shield, in its operative condition, covers a gap between the top of the front wheel and a part of the body or chassis of the motorcycle immediately above the wheel. However, due to the suspension movements described above, the size of this gap continually changes. The invention advantageously provides for the shield automatically to adjust for the changing size of this gap. In a particular embodiment of the invention, in which the shield comprises a fixed component and a pivotally displaceable upper component which covers the above-mentioned gap, the upper component may be urged upwards, for instance by a spring arrangement, so that closing of the gap results in pivotal retraction of the upper component against the urging of its spring arrangement.

Preferably, the assembly includes an actuator to effect powered displacement of the shield between its stowed condition and its operative condition. The actuator may be in the form of pneumatic or hydraulic cylinders acting between the shield components. Instead, the actuator may be in the form of a gearing arrangement, such as a rack and pinion mechanism. The gearing arrangement may in such case include a gear rack on one component and a pinion gear on the adjacent component, the pinion gear being drivingly connectable to a control arrangement, as defined below, for controlling the displacement of the components relative to each other. Alternatively, the actuator may be configured for screwing displacement of the components relative to each other, for instance comprising a threaded connector or bolt which is drivingly rotatable. In yet another embodiment of the invention, the actuator may be in the form of one or more electric solenoids acting between the respective components of the shield.

The assembly may include a control arrangement to control operation of the actuator for displacement of the shield between its operative condition and its stowed condition. Preferably, the control arrangement includes a user operable control for mounting on a handle bar of the motorcycle, to permit user control over the condition of the shield. In one embodiment of the invention, the user operable control can be in the form of push buttons or dials on the handle bar.

Instead, or in addition, the control arrangement may be configured automatically to initiate displacement of the shield into its stowed condition or into its operative condition, as the case may be, in response to predefined conditions being met.

Optionally, the control arrangement includes temperature sensing means for measuring the engine temperature of the motorcycle, and response means for automatically displacing the shield into its stowed condition when the engine temperature, as measured by the temperature sensing means, exceeds a preset threshold temperature. It will be appreciated that the shield, in its operative condition, can affect the flow of air over the engine, and can thus result in undesired heating of the engine. The control arrangement defined above ameliorates this effect by automatically moving the shield into its stowed condition, to permit air flow over the engine for air cooling of the engine. The preset threshold temperature will typically be more or less equal to the temperature at which a warning light or indicator on a dashboard or the motorcycle is automatically activated.

The control arrangement may, instead or in addition, include a tilt sensor for sensing tilting of the motorcycle relative to the vertical, and response means automatically to displace the shield from its operative condition in response to tilting of the motorcycle, as measured by the tilt sensor, past a predetermined threshold value. In use, when travelling at speed along a straight, the motorcycle will be upright with its front wheel rotational axis generally horizontal, the fairing assembly having its shield in the outward extended position, affording maximum protection against drag to the front and the wheel of the motorcycle. However, during cornering, it might be desired for the shield to be retracted automatically, and such automatic retraction is achieved by the tilt sensor as defined above. Typically, the tilt sensor is arranged to effect automatic retraction of the shield when the motorcycle tilts by more than 30° from the vertical.

Differently defined, the invention thus provides a motorcycle fairing assembly for a front wheel of a motorcycle, the fairing assembly permitting optional variation in coverage by the fairing assembly of a frontal projected area of the front wheel.

The invention extends to motorcycle which includes an aerodynamic shield mounted adjacent a front wheel of the motorcycle, the shield being operable between a stowed condition and an operative condition in which the shield is positioned to reduce aerodynamic drag on the front wheel, such that, in use, the drag on the front wheel is smaller when the shield is in its operative condition than when the shield is in its stowed condition.

The motorcycle may include a fairing assembly as defined above. It will be appreciated that the fairing assembly can be retrofitted on a motorcycle to form a motorcycle as defined, or, instead, the fairing assembly as defined above can be incorporated in the motorcycle during initial manufacturing.

The motorcycle may include a front mudguard which provides an integrally formed shield component which is connected to another shield component, the components being displaceable relative to each other to vary the frontal projected area of the composite shield.

The invention also provides a method of improving aerodynamic characteristics of a motorcycle, which method includes moving a shield mounted on a front wheel of the motorcycle between a stowed condition and an operative condition, the shield, in its operative condition, being shaped and positioned to reduce aerodynamic drag on the front wheel, when compared to drag on the wheel when the shield is in this stowed condition.

The method may include moving the shield into its operative or its stowed condition in response to user control input.

Instead, or in addition, the method may include measuring the motorcycle's engine temperature and automatically moving the shield into its stowed condition when the engine temperature rises above a predetermined threshold temperature. The method may include automatically moving the shield into its stowed condition in response to tilting of the motorcycle past a predetermined threshold angle.

The invention accordingly extends also to a method of controlling a fairing assembly having at least two fairing components, the one component nesting within the other, and the fairing components being adjustable in position relative to one another, to permit adjustment in frontal projected area of the assembly, which method includes:

sensing the degree of tilt of the motorcycle front wheel rotational axis relative to the horizontal; and, in response thereto varying the frontal projected area of the fairing in relation to the sensed degree of tilt.

The invention will now be described by way of example with reference to the accompanying diagrammatic drawings, in which:

FIG. 4 is a view corresponding to FIG. 1 of another embodiment of a fairing assembly in accordance with the invention, the assembly being in its operative condition; and FIG. 5 is a schematic front view of the fairing assembly of FIG. 4.

Figure 1:
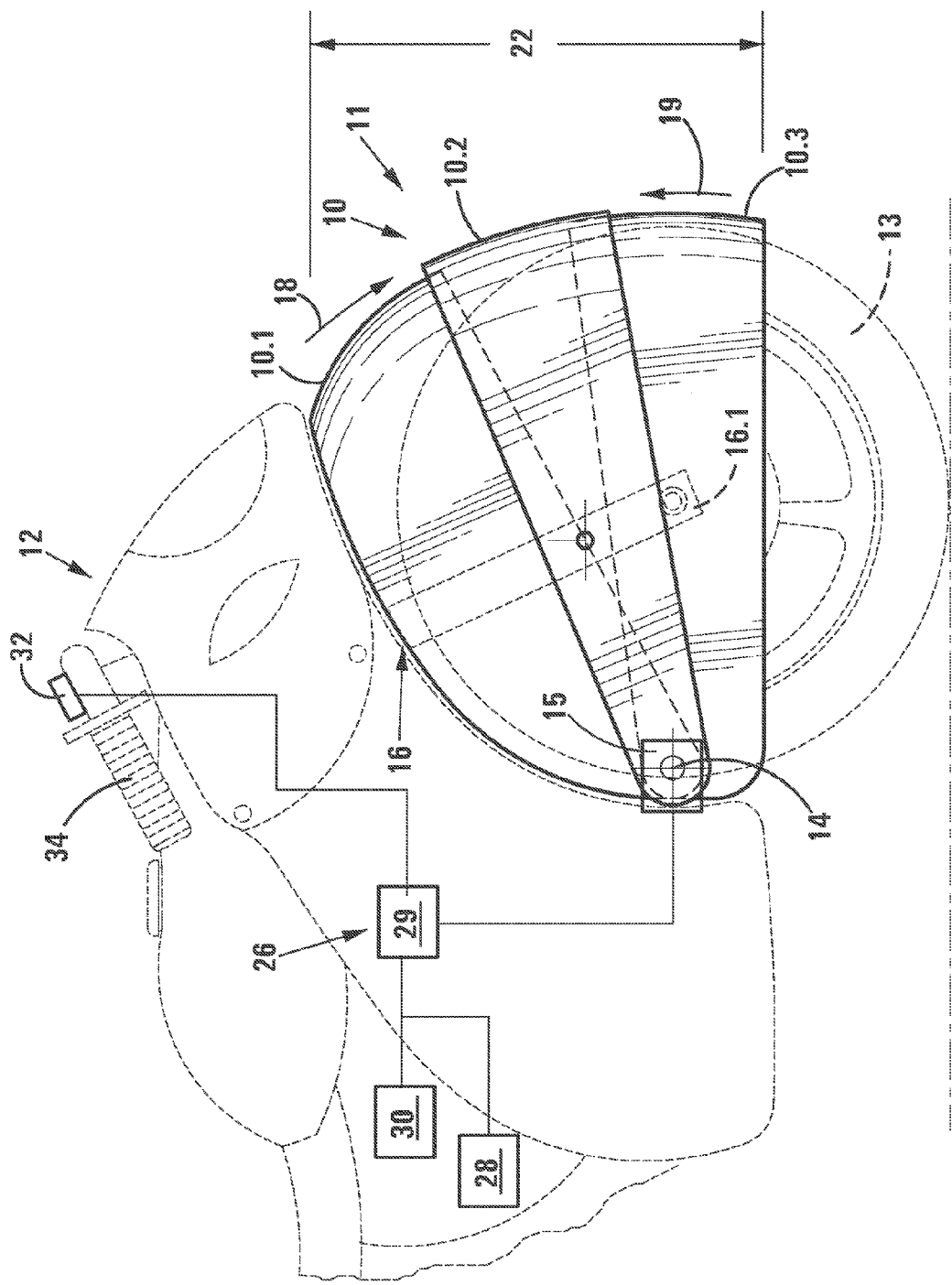
FIG. 1 is a side elevational view of a fairing assembly in accordance with the invention, the assembly being mounted on a front of a motorcycle, the fairing assembly being in its operative condition, providing maximum reduction of aerodynamic drag on the front wheel of the motorcycle.

In the drawings, reference numeral 10 generally indicates a displaceable fairing assembly in accordance with the invention, as mounted on a motorcycle generally indicated by reference numeral 12. The assembly 10 includes a composite shield 11 which is operable between: an operative condition (FIG. 1) in which the shield 11 covers at least an upper half of the motorcycle's front wheel 13, to minimise drag on the wheel; and a stowed condition (FIG. 2) in which the shield 11 covers a reduced portion of the wheel 18, to permit conventional operation of the motorcycle 12.

The shield 11 comprises three components namely an upper component 10.1, a middle component 10.2, and lower component 10.3, the upper- and lower components 10.1, 10.3 nesting on the inside of the middle component 10.2, and being telescopically slideable within the middle component 10.2 by pivoting relative thereto about an axis 14 which is transverse to the fore and aft direction of the motorcycle 12. The pivot axis 14 of the assembly 10 is thus parallel to an axis of rotation of the front wheel 13.

Figure 2:
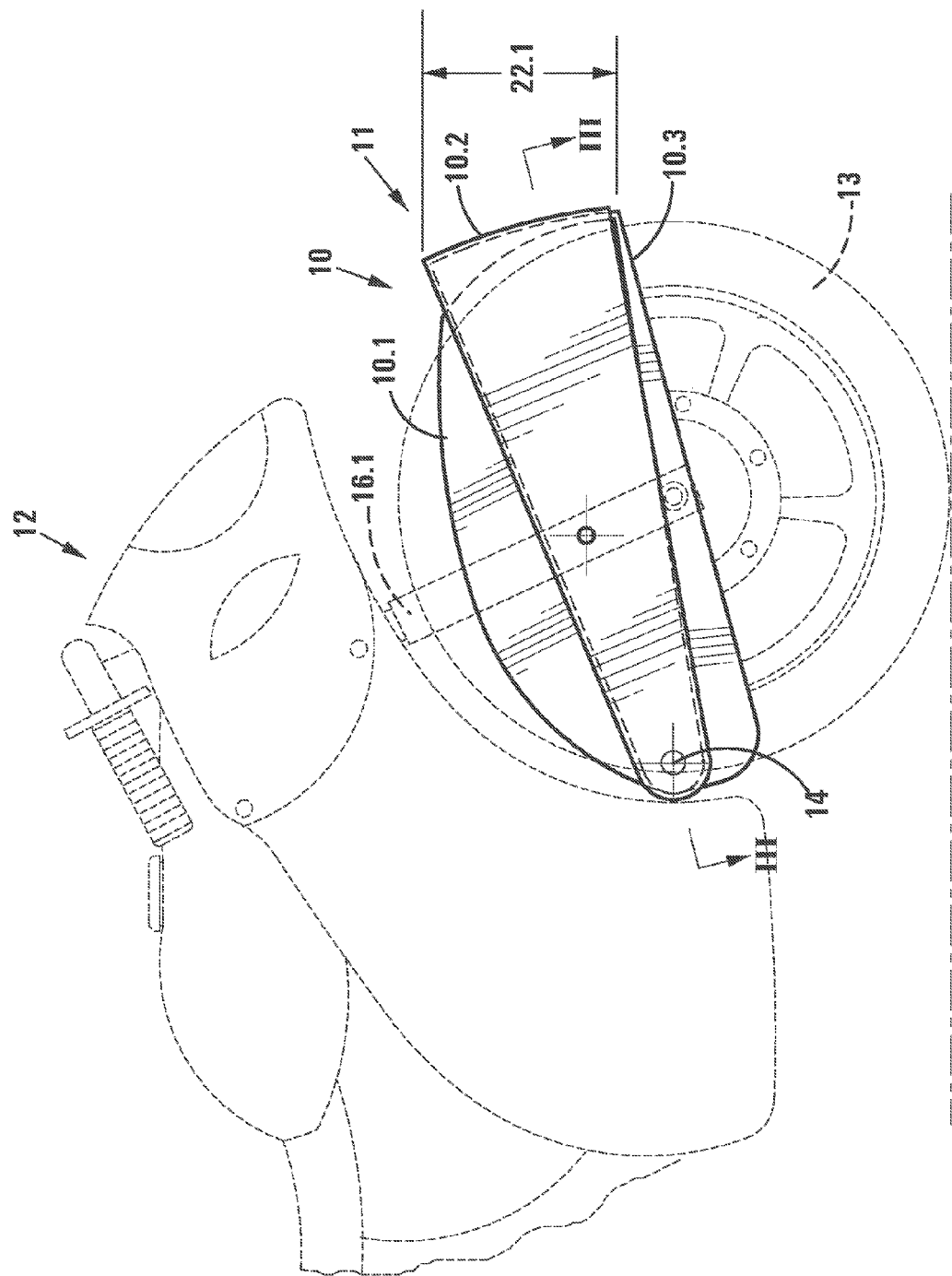
FIG. 2 is a view similar to FIG. 1, but with the fairing assembly in its stowed condition.
Figure 3:
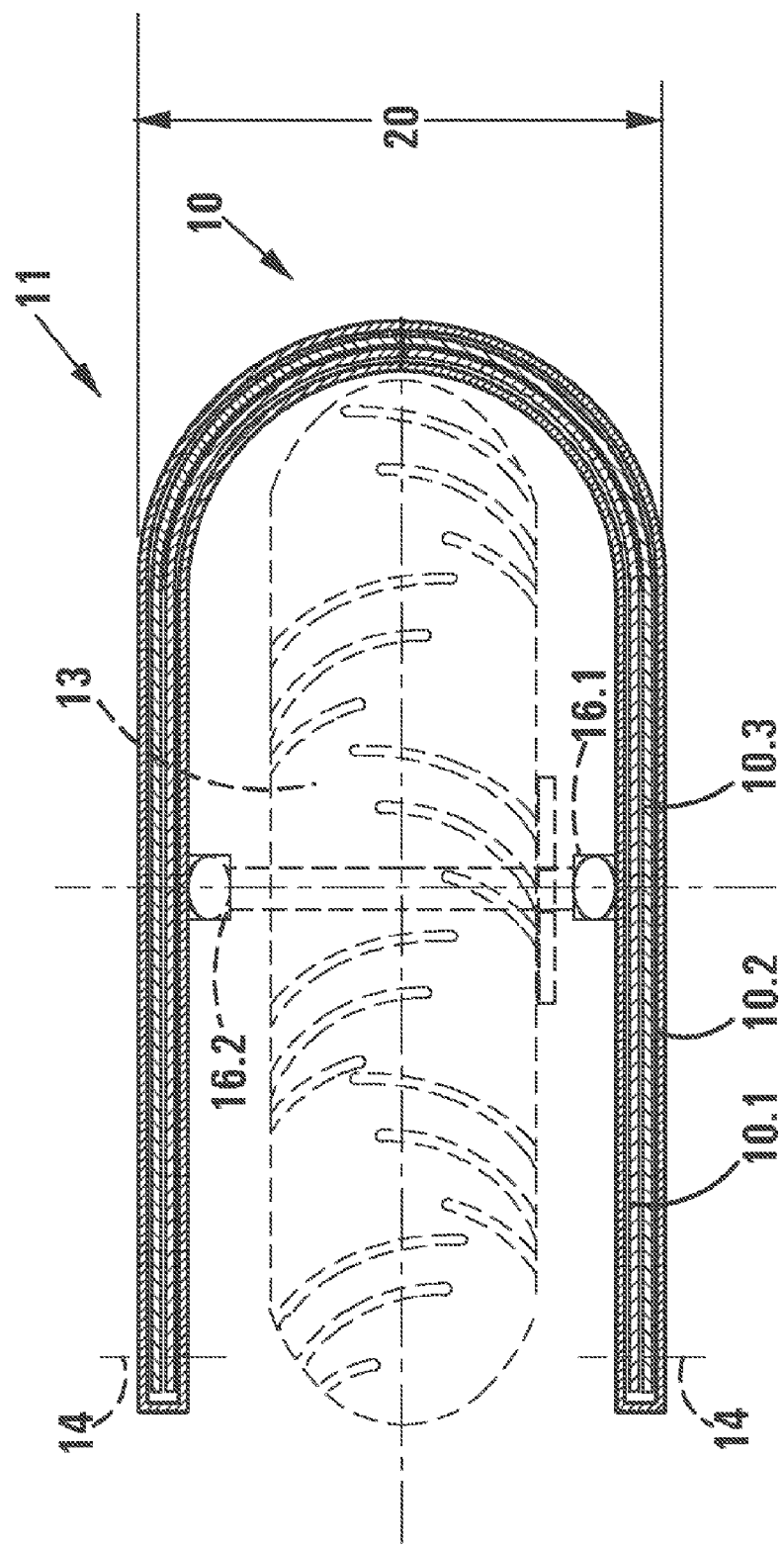
FIG. 3 is a sectional plan view of the fairing assembly as at III-III in FIG. 2.

As can be seen in FIG. 2, the components 10.1-10.3 are of plate material, being generally U-shaped in plan view. In FIG. 3, it can be seen that component 10.2 is hollow, the other two components 10.1 and 10.3 being receivable in the hollow component 10.2, when the shield 11 is in its stowed condition. Each component 10.1-10.3 thus has two limbs positioned on opposite sides of a front wheel 13, a leading portion of each component, connecting the limbs, being smoothly curved. The leading front portions of the components 10.1-10.3 thus present an aerodynamically efficient leading edge of the motorcycle 12, in use.

In the embodiment illustrated in FIG. 3, the limbs of the components 10.1-10.3 are more or less parallel to each other, extending in the lengthwise direction of the motorcycle 12. However, in other embodiments of the invention, the shield in 11 can widen progressively from its leading edge, so that the shield 11 is wider at the back than at the front. In such case, a view corresponding to FIG. 3 would show the shield 11 to be V-shaped with a rounded leading end, the limbs of the shield 11 of thus being splayed.

The fairing components 10.1, 10.2 and 10.3 have matching shoulders or stop formations (not shown), to limit the outward displacement of the upper- and lower components 10.1, 10.3 relative to the middle component 10.2.

The assembly 10 is mounted to prongs 16.1 and 16.2 of a front fork 16 of the motorcycle 12, the components 10.1 and 10.3 being pivotally mounted on the middle component 10.2 for displacement about the pivot axis 14. The middle component 10.2 is thus fixed relative to the fork 16 and pivots with the fork 16 upon steering of the motorcycle 12.

Such mounting permits the upper- and lower components 10.1, 10.3 to pivot about the axis 14 in the direction of arrows 18 and 19 respectively from the extended position shown in FIG. 1, to the retracted position shown in FIG. 2, and permits similar displacement in opposite directions for expanding the shield 11.

It is to be appreciated that the components 10.1, 10.3 can be displaced manually or mechanically, while such mechanical displacement can be either selective or automatic. The motorcycle 12 thus includes a powered actuator, in this case a small electric motor 15, operatively connected to the displaceable components 10.1, 10.3, to actuate movement of the components 10.1 and 10.3 between the extended condition and the retracted condition of the assembly 10.

In another embodiment of the invention, the actuator can include at least one pneumatically operated cylinder or actuator (not shown) fitted to each displaceable component 10.1, 10.3 for effecting either optional or automatic displacement of the components 10.1-10.3.

Similarly, in even another embodiment of the invention, the actuator may include a gearing arrangement (not shown). The gearing arrangement can include a gear rack on one component and a pinion gear on the adjacent component, the pinion gear being drivingly connectable to the controlling arrangement for controlling the displacement of the components relative to each other. In such case, in another embodiment of the invention, the components can be displaced relative to each other in a manner which does not involve pivotal displacement, for instance telescoping rectilinearly relative to each other. Alternatively, the displaceable components which cover the wheel can be displaceable in a horizontal direction, for instance being slidable along guide tracks. In such case, the components and their movement will preferably be symmetrical about a plane in which the wheel 13 lies.

The actuator 15 is connected to a control arrangement, generally indicated by reference numeral 26 for automatically and/or selectively displacing the upper- and lower components 10.1, 10.3.

The control arrangement 26 includes a temperature sensing means 28 for sensing an undesirably high operating temperature of the motorcycle engine. The temperature sensor 28 is connected to an on-board computer 29 which controls the actuator 15. The control computer 29 thus provides a response means for automatically displacing the upper- and lower components 10.1, 10.3 to their retracted position is (FIG. 2) in response to the measurement by the temperature sensor 28 of an engine temperature which is higher than a predetermined threshold value. Displacement of the assembly 10 to its retracted position in such case permits air flow over the engine for cooling the engine.

The control arrangement 26 further includes a tilt sensor 30 for measuring the angle of the motorcycle 12 relative to the vertical. That the sensor 30 is also connected to the on-board computer 29, so that measuring by the tilt sensor 30 of a tilt angle greater than a predetermined threshold results in automatic retraction of the outer components 10.1 and 10.3. In this example, the threshold angle is 30°.

The control arrangement 26 also includes user operable controls 32 provided on handle bars 34 of the motorcycle 12, so that a driver of the motorcycle 12 can effect selective switching of the shield 11 between its operative condition and its stowed condition. In this example, the controls 32 are in the form of push buttons. Again, the controls 32 are connected to the on-board computer 29. It will be appreciated that the tilt sensor 30, the temperature sensor 28, and the controls 32 need not be in communication with an on-board computer 29, as is the case in this example and can, in other embodiments, being connected directly to the actuator 15.

The frontal projected area of the shield 11, in its operative condition, is determined by multiplying the width 20 of the components (FIG. 3) by the cumulative height 22 (FIG. 1) of the shield 11. Similarly, the frontal projected area of the shield 11 in its stowed condition, is determined by multiplying the height 22.1 (FIG. 2), by the width 20.

In use, if a rider of the motorcycle 12 wishes to reduce the aerodynamic drag experienced by the motorcycle 12 at speed, the user displaces the upper- and lower components 10.1, 10.3 into their extended positions, to increase the frontal projected area of the fairing assembly 10 and thus decrease the coefficient of drag of the motorcycle 12.

It will be appreciated that the upper part of the front wheel 13 moves forwards at twice the speed of the motorcycle 12. Because aerodynamic drag increases cubically with an increase in speed, the Applicant believes that the total coefficient of drag of the motorcycle 12 can be reduced significantly by covering a substantial part of the wheel 13, and in particular the upper part of the wheel 13. Such covering of the wheel 13 is achieved by the fairing assembly 10 in its extended condition.

However, steering of the motorcycle 12 by pivotal movement of the handle bars 32 will be affected by the fairing assembly 10 in its extended condition, as the fairing assembly 10 can snag or foul on the chassis, engine, or other fairing components of the motorcycle 12. For this reason, a user has the option of displacing the fairing assembly 10 into its retracted position if significant steering of the front wheel 13 is anticipated. It will be appreciated that steering of a motorcycle travelling at high speed is achieved not by pivoting of the front wheel 13, but rather by the lateral inclination of the motorcycle 12. Pivotal steering of the front wheel 13 is thus minimal, if not absent, when the motorcycle 12 travels at speed.

The fairing assembly 10 can thus be used in its retracted position while travelling at lower speeds, such as in traffic, where steering by use of the front wheel 13 is required. When higher speeds are reached, the fairing assembly 10 can be moved into its extended condition, to maximise the reduction in aerodynamic drag achieved by shielding part of the front wheel 13.

In use, the tilt sensor 30 senses the degree of tilt of the motorcycle front wheel rotational axis relative to the horizontal, and in response thereto automatically varies the displacement of the fairing components 10.1 and 10.3 relative to the middle component 10.2. Similarly, the temperature sensor 28 senses the operating temperature of the engine, and in response varies the frontal projected area of the shield 11 to permit air flow over the engine, if required, to prevent overheating of the engine.

It is to be appreciated that the shield can, in other embodiments, be constructed differently, while still being within the scope of this invention. For example, the components of the shield may, in other embodiments, be displaceable horizontally relative to each other, instead of being vertically displaceable as is the case in the example embodiments. In such case, the components may slide horizontally backwards into their stowed condition, optionally being guided on guided tracks and being symmetrical about a plane in which the front wheel 13 lies.

In FIG. 4, reference 40 generally indicates another embodiment of a fairing assembly and motorcycle 12 in accordance with the invention. Like numerals indicate like parts in FIGS. 1-3 and in FIG. 4, unless otherwise indicated.

The fairing assembly 40 of FIG. 4 functions substantially similarly to the fairing assembly 11 of FIGS. 1-3, a major distinction being that a shield 42 of the assembly 40 comprises four components 44, 46, 50. One of the components 44 is fixed, and is integrally formed with a mudguard 48 which extends along part of the circumference of the wheel 13, covering an upper part of the wheel 13

The mudguard 48 and the fixed component 44 are thus essentially a single part which forms a more aesthetically pleasing whole. The displaceable components 46, 50 are slidably displaceable on the fixed component 44 for sliding upwards into the operative condition. The shield 42 thus includes two cheek plates on opposite sides of the fixed component 44, and a nose plate 50 which extends transversely between the cheek plates 46 at the front of the shield 42.

As can be seen in FIG. 4 of the drawings, the cheek plates 46 are mounted for sliding upwards and backwards relative to the fixed component 44 from the stowed position into the operative condition. In the example embodiment, the cheek plates 46 have rearwardly inclined guide slots 56 for guiding relative sliding motion of the cheek plates 46.

Referring now to FIG. 5 of the drawings, it can be seen that the shield 42 is tapered when seen in front view, the outline of the shield 42 widening upwards. Advantageously, the shield 42 is shaped such that it matches the profile of side fairings 54 and a top fairing 52 of the motorcycle 12, when seen in the front view. Rear trailing edges of the shield 42 are thus more or less flush with the top fairing 52 and the side fairings 54 respectively, to promote smooth air flow from the shield 42 on to the fairings 52, 54. In addition to widening from bottom to top, the shield 42 also widens from front to back, so that it is roughly V-shaped in sectional plan view. such progressive widening of the shield 42 further promotes a smooth transition between the shield 42 and the fairings 52, 54, which are similarly inclined relative to the direction of travel of the motorcycle 12, in use.

It will be appreciated that, because of the tapered form of the shield 42, the shield 42 is wider at its top than at its bottom, so that the width of the shield 42 increases when the plates 46 and the nose plate 50 slide upwards into the operative condition. To accommodate such widening, the nose plate 50 is slidably mounted on the cheek plates 46 for sliding more or less horizontally relative to the cheek plates 46. For this reason, the nose plate 50 has horizontal guide slots 58 which co-operate with complementary guide bolts on the cheek plates 46 to guide sliding movement of the nose plate 58.

When the displaceable components 46, 50 are moved from the stowed condition, in which the components 46, 50 together match the outline of the component 44, to the operative condition, the cheek plates 46 slide upwards while the nose plate 50 slides simultaneously upwards relative to the fixed component 44 and slides horizontally relative to the cheek plates 46.

Because the shield 42 includes an integrally formed mudguard 48, the displaceable part of the shield 42 need not move as far from its stowed condition as is the case in the shield 11 of FIGS. 1-3.

The Applicant has found that at the high speeds attained during motorcycle races, a slight reduction in aerodynamic drag can provide significant improvements in the peak performance of a motorcycle, and the Applicant believes that the fairing assembly as described in the drawings reduces drag on a motorcycle, when compared to conventional fairings.

The invention claimed is:

1. A fairing assembly for a motorcycle, which assembly includes:
   an aerodynamic shield which is mountable on a motorcycle and operable between a stowed condition and an operative condition in which the shield is positioned to reduce aerodynamic drag on a front wheel of a motorcycle, such that, in use, the drag on the front wheel is smaller when the shield is in its operative condition than when it is in its stowed condition; and
   a mounting arrangement for mounting the shield on a motorcycle, the assembly being characterised in that the shield includes a fixed component which is fixedly mountable to a motorcycle and at least two displaceable components which are displaceable relative to the fixed component,
   wherein the assembly further comprises a control arrangement which includes temperature sensing means configured to sense the temperature of a motorcycle engine and response means configured to instruct displacement of the shield into its stowed condition when the engine temperature sensed by the temperature sensing means exceeds a preset threshold temperature.

2. An assembly as claimed in claim 1, in which a frontal projected area of the shield is greater in its operative condition than in its stowed condition.

3. An assembly as claimed in claim 1, in which each of the shield components is of plate material and is generally U-shaped, having a pair of limbs which extend along opposite sides of the front wheel, in use, and a curved front portion connecting the limbs.

4. An assembly as claimed in claim 3, in which the shield components are telescopically displaceable, so that the components are nested one within the other when the shield is in its stowed condition.

5. An assembly as claimed in claim 4, in which the shield components are mounted for relative displacement about a pivot axis which is transverse to limbs of the components.

6. An assembly as claimed in claim 1, which includes two cheek plates mounted on opposite sides of the fixed component for displacement relative to the fixed component from the stowed condition into the operative condition.

7. An assembly as claimed in claim 6, in which the cheek plates are mounted for displacement upwards and backwards relative to the fixed component.

8. An assembly as claimed in claim 6, which includes a nose plate mounted to the fixed component between the cheek plates for displacement relative to the fixed component.

9. An assembly as claimed in claim 1, which includes an actuator to effect powered displacement of the shield between its stowed condition and its operative condition.

10. An assembly as claimed in claim 1, in which the control arrangement includes a user operable control for mounting on a handle bar of the motorcycle, to permit user control over the condition of the shield.

11. An assembly as claimed in claim 1, in which the control arrangement includes a tilt sensor for sensing tilting of a motorcycle relative to the vertical, the response means being configured automatically to displace the shield from its operative condition to its stowed condition in response to tilting of the motorcycle, as measured by the tilt sensor, past a predetermined threshold value.

12. A motorcycle which includes an aerodynamic shield mounted adjacent a front wheel of the motorcycle, the shield being operable between a stowed condition and an operative condition in which the shield is positioned to reduce aerodynamic drag on the front wheel, such that, in use, the drag on the front wheel is smaller when the shield is in its operative condition than when the shield is in its stowed condition characterised in that the shield includes a fixed component which is fixedly mounted to a motorcycle and at least two movable components which are displaceable relative to the fixed component, and a control arrangement which includes temperature sensing means for measuring the engine temperature of the motorcycle and response means configured to instruct automatically displace the shield into its stowed condition when the engine temperature rises above a predetermined threshold temperature.

13. A motorcycle as claimed in claim 12, which includes a fairing assembly.

14. A motorcycle as claimed in claim 12, which includes a front mudguard which provides an integrally formed shield component which is connected to another shield component, said other component being displaceable relative to, the mudguard to vary the frontal projected area of the composite shield.

15. A motorcycle as claimed in claim 12, which includes at least one of a side fairing and top fairing, the aerodynamic shield being configured such that at least in its operative condition it widens from top to bottom and from front to back to promote a smooth transition between the shield and the side fairing and/or the top fairing.

16. A method of improving aerodynamic characteristics of a motorcycle, which method includes moving a shield mounted adjacent a front wheel of the motorcycle between a stowed condition and an operative condition, the shield, in its operative condition, being shaped and positioned to reduce aerodynamic drag on the front wheel, when compared to drag on the wheel when the shield is in this stowed condition characterised in that the shield includes a fixed component which is fixedly mounted to a motorcycle and at least two movable components which are displaceable relative to the fixed component, wherein the method further comprises measuring the motorcycle's engine temperature and automatically moving the shield into its stowed condition when the engine temperature rises above a predetermined threshold temperature.

17. A method as claimed in claim 16, which includes moving the shield into its operative or its stowed condition in response to user control input.

18. A method as claimed in claim 16, which includes automatically moving the shield into its stowed condition in response to tilting of the motorcycle past a predetermined threshold angle.

19. A motorcycle as claimed in claim 12, in which the shield, in its operative condition, shields at least an upper half of a front wheel, when the shield in seen in front projection.

20. A motorcycle as claimed in claim 12, in which the shield, in its operative condition, covers a substantial part of sides of the front wheel.

21. A motorcycle as claimed in claim 12, in which the shield includes a middle component which is fixed relative to a steering fork, and upper and lower components which are pivotally displaceable on opposite directions towards and away from the middle component.

22. A motorcycle as claimed in claim 12, in which the shield in its operative condition, covers a mud guard positioned above the front wheel, the mud guard being exposed when the shield is in its stowed condition.

23. A shield as claimed in claim 12, in which the fixed component is integrally formed with a mud guard of the front wheel.

* * * * *